(12) United States Patent
Langhammer

(10) Patent No.: US 10,073,676 B2
(45) Date of Patent: Sep. 11, 2018

(54) REDUCED FLOATING-POINT PRECISION ARITHMETIC CIRCUITRY

(71) Applicant: Altera Corporation, San Jose, CA (US)

(72) Inventor: Martin Langhammer, Salisbury (GB)

(73) Assignee: ALTERA CORPORATION, San Jose, CA (US)

( * ) Notice: Subject to any disclaimer, the term of this patent is extended or adjusted under 35 U.S.C. 154(b) by 50 days.

(21) Appl. No.: 15/272,231

(22) Filed: Sep. 21, 2016

(65) Prior Publication Data

US 2018/0081632 A1 Mar. 22, 2018

(51) Int. Cl.
G06F 7/487 (2006.01)
G06F 17/16 (2006.01)

(52) U.S. Cl.
CPC ............ *G06F 7/4876* (2013.01); *G06F 17/16* (2013.01); *G06F 2207/483* (2013.01)

(58) Field of Classification Search
None
See application file for complete search history.

(56) References Cited

U.S. PATENT DOCUMENTS

| | | | |
|---|---|---|---|
| 5,631,859 A * | 5/1997 | Markstein | G06F 7/483 708/204 |
| 8,301,681 B1 | 10/2012 | Yee et al. | |
| 9,098,332 B1 | 8/2015 | Langhammer | |
| 2004/0205096 A1 * | 10/2004 | Hansen | G06F 9/30014 708/513 |
| 2006/0101244 A1 * | 5/2006 | Siu | G06F 7/483 712/221 |
| 2006/0149803 A1 * | 7/2006 | Siu | G06F 9/30014 708/501 |
| 2013/0138711 A1 | 5/2013 | Sugisawa | |
| 2014/0067895 A1 | 3/2014 | Wang | |
| 2014/0089371 A1 | 3/2014 | Florent et al. | |

(Continued)

OTHER PUBLICATIONS

PCT International Search Report & Written Opinion for PCT Application No. PCT/US2017/045399 dated Nov. 17, 2017; 16 Pages.

*Primary Examiner* — David H Malzahn
(74) *Attorney, Agent, or Firm* — Fletcher Yoder, P.C.

(57) ABSTRACT

The present embodiments relate to performing reduced-precision floating-point arithmetic operations using specialized processing blocks with higher-precision floating-point arithmetic circuitry. A specialized processing block may receive four floating-point numbers that represent two single-precision floating-point numbers, each separated into an LSB portion and an MSB portion, or four half-precision floating-point numbers. A first partial product generator may generate a first partial product of first and second input signals, while a second partial product generator may generate a second partial product of third and fourth input signals. A compressor circuit may generate carry and sum vector signals based on the first and second partial products; and circuitry may anticipate rounding and normalization operations by generating in parallel based on the carry and sum vector signals at least two results when performing the single-precision floating-point operation and at least four results when performing the two half-precision floating-point operations.

20 Claims, 7 Drawing Sheets

(56) References Cited

U.S. PATENT DOCUMENTS

| | | | | |
|---|---|---|---|---|
| 2014/0195580 A1* | 7/2014 | Anderson | ........... | G06F 9/30014 708/501 |
| 2017/0322769 A1* | 11/2017 | Langhammer | .......... | G06F 5/012 |
| 2018/0081632 A1* | 3/2018 | Langhammer | ........ | G06F 7/4876 |

* cited by examiner

REDUCED FLOATING-POINT PRECISION ARITHMETIC CIRCUITRY

BACKGROUND

The present embodiments relate to integrated circuits and, more particularly, to performing reduced-precision floating-point arithmetic operations using specialized processing blocks with higher-precision floating-point arithmetic circuitry.

As applications increase in complexity, it has become more common to include specialized processing blocks in integrated circuits. Such specialized processing blocks may be partly or fully hardwired to perform one or more specific tasks, such as a logical or a mathematical operation. A specialized processing block may also contain one or more specialized structures, such as an array of configurable memory elements.

Examples of structures that are commonly implemented in such specialized processing blocks include: multipliers, arithmetic logic units (ALUs), barrel-shifters, various memory elements or storage circuits such as first-in first-out (FIFO) circuits, last-in first-out (LIFO) circuits, serial-in parallel-out (SIPO) shift register circuits, parallel-in serial-out (PISO) shift register circuits, random-access memory (RAM) circuits, read-only memory (ROM) circuits, content-addressable memory (CAM) circuits and register files, logic AND, logic NAND, logic OR, logic NOR arrays, etc., or combinations thereof.

One particularly useful type of specialized processing block, which is sometimes also referred to as a digital signal processing (DSP) block, may be used to process digital signals such as video signals, audio signals, etc. Such blocks are frequently also referred to as multiply-accumulate (MAC) blocks, because they include structures to perform multiplication operations, and sums and/or accumulations of multiplication operations.

Integrated circuits such as programmable integrated circuits sold by Altera Corporation, of San Jose, Calif., as part of the STRATIX® and ARRIA® families include specialized processing blocks, each of which includes a plurality of multipliers. Each of those specialized processing blocks also includes adders and registers, as well as programmable connectors (e.g., multiplexers) that allow the various components of the block to be configured in different ways.

Typically, the arithmetic operators (adders and multipliers) in such specialized processing blocks have been fixed-point operators. If floating-point operators were needed, they would be construct outside the specialized processing block using general-purpose programmable logic of the device, or using a combination of the fixed-point operators inside the specialized processing block with additional logic in the general-purpose programmable logic.

SUMMARY

Single-precision floating-point multiplication circuitry that performs first and second half-precision floating-point multiplication operations may include first, second, and third arithmetic operator circuits and a compressor circuit. The first arithmetic operator circuit may generate a first partial product of first and second half-precision floating-point numbers, and the second arithmetic operator circuit may generate a second partial product of third and fourth half-precision floating-point numbers. The compressor circuit may generate a carry vector signal and a sum vector signal based on the first and second partial products, and the third arithmetic operator circuit may generate in parallel at least first and second results of the first half-precision floating-point multiplication operation and at least third and fourth results of the second half-precision floating-point multiplication operation based on the carry and sum vector signals to anticipate rounding and normalization operations.

It is appreciated that the embodiments described herein can be implemented in numerous ways, such as a process, an apparatus, a system, a device, or a method executed on a processing machine. Several inventive embodiments are described below.

In certain embodiments, the above mentioned single-precision floating-point multiplication circuitry may include a first partial product generator in the first arithmetic operator circuit that generates first and second output vector signals based on the first and second half-precision floating-point numbers, and a second partial product generator in the second arithmetic operator circuit that generates third and fourth output vector signals based on the third and fourth half-precision floating-point numbers.

If desired, the first arithmetic operator circuit may include a fourth arithmetic operator circuit that performs a 4:2 compression of the first, second, third, and fourth output vector signals, and a bypass path around the fourth arithmetic operator circuit that conveys the first and second output vector signals as the first partial product from the first arithmetic operator circuit to the compressor circuit and the third and fourth output vector signals as the second partial products from the second arithmetic operator circuit to the compressor circuit.

In certain embodiments, the third arithmetic operator circuit may include a combinational circuit that generates an input propagate vector signal and an input generate vector signal based on the carry and sum vector signals. The combinational circuit may include logical exclusive OR gates that perform a bitwise XOR operation of the carry and sum vector signals to generate the input propagate vector signal with the least significant bit of the input propagate vector signal being set to one, and logical AND gates that perform a bitwise AND operation of the carry and sum vector signals to generate the input generate vector signal.

Further features of the invention, its nature and various advantages, will be apparent from the accompanying drawings and the following detailed description of the preferred embodiments.

DETAILED DESCRIPTION

The present embodiments provided herein relate to integrated circuits and, more particularly, to performing reduced-precision floating-point arithmetic operations using specialized processing blocks with higher-precision floating-point arithmetic circuitry.

Specialized processing blocks that perform arithmetic operations may be optimized to support floating-point operations of a predetermined precision. For example, some specialized processing blocks may be optimized to support single-precision floating-point operations very efficiently, but have poor support for half-precision floating-point operations or double-precision floating-point operations.

However, power consumption and functional density are important aspects in circuit design, and many applications do not require single-precision floating-point arithmetic. For example, convolutional neural networks (CNN) may work very well with a mixture of half-precision floating-point arithmetic (i.e., FP16) and single-precision floating-point arithmetic circuitry (i.e., FP32). Therefore, it may be desirable that a specialized processing block supports both, single-precision floating-point arithmetic and half-precision floating-point arithmetic, efficiently and effectively.

It will be recognized by one skilled in the art, that the present exemplary embodiments may be practiced without some or all of these specific details. In other instances, well-known operations have not been described in detail in order not to unnecessarily obscure the present embodiments.

Figure 1:
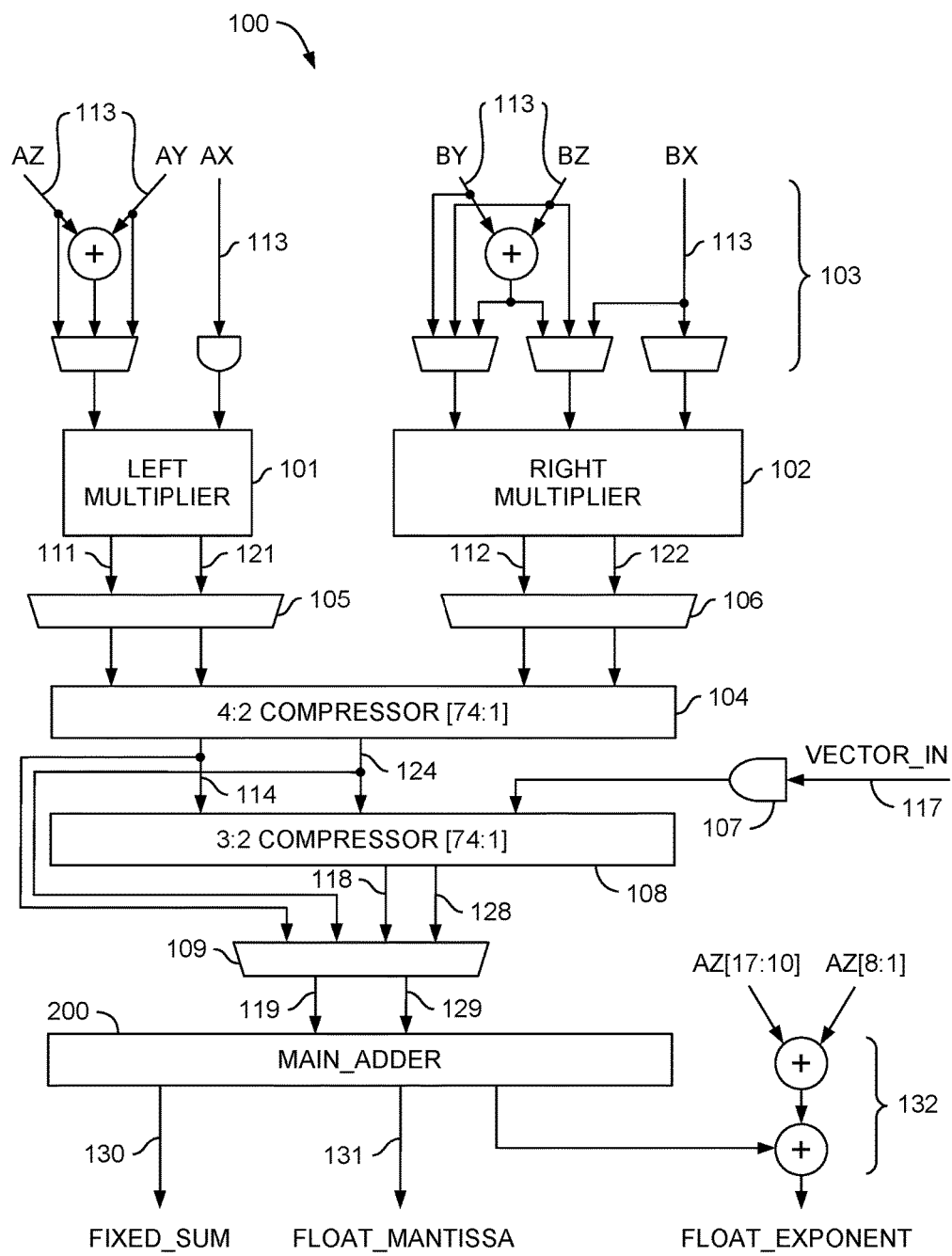
FIG. 1 is a diagram of an illustrative specialized processing block that is configurable to perform a single-precision floating-point operation or two half-precision floating-point operations in accordance with an embodiment.

An illustrative embodiment of a specialized processing block 100 that is adaptable to efficiently implement fixed-point operations and single-precision and half-precision floating-point operations is shown in FIG. 1. In this logical representation, implementation details, such as registers and some programmable routing features, such as multiplexers that may allow the output of a particular structure to be routed around certain components or directly out of the specialized processing block, are omitted to simplify discussion.

In the logical representation of FIG. 1, "left multiplier" 101 is a partial product generator such as an 18×18 partial product generator, which may be used, e.g., as two 9×18 partial product generators, if desired. Left multiplier 101 may produce two dimensionless output vectors 111, 121. Similarly, "right multiplier" 102 is a partial product generator such as an 18×18 partial product generator, which may be used, e.g., as a 18×9 partial product generator and a 27×9 partial product generator. Right multiplier 102 may produce two dimensionless output vectors 112, 122.

Under the IEEE 754-1985 standard, a single-precision floating-point number has a mantissa size of 23 bits exclusive of an implied leading '1', while a half-precision floating-point number has a mantissa size of 10 bits exclusive of the implied leading '1'. Thus, left multiplier 101 and right multiplier 102 may each implement an 18×18 partial product generator to support two half-precision floating-point multiplication operations, or together, left multiplier 101 and right multiplier 102 may implement a 27×27 partial product generator to support single-precision floating-point multiplication.

Input multiplexer stage 103 may combine and align between four and six inputs 113 according to the needs of a particular user logic design.

Multiplexers 105, 106 may align vectors 111, 121, 121, and 122, respectively, according to the type of operation being performed, as determined by a user design, if desired. Specifically, vectors 111, 112, 121, and 122 may be totally offset from one another (e.g., to perform two separate smaller multiplications, such as two 9×9 multiplications), totally aligned with one another (e.g., to perform one larger multiplication, such as one 18×18 multiplication), or partially aligned with one another (e.g., to perform a "rectangular" multiplication, such as a 9×18 multiplication).

4:2 compressor 104 may combine the four dimensionless output vectors 111, 112, 121, and 122 into two dimensionless output vectors 114 and 124. If desired, each of the input and output vectors of 4:2 compressor 104 may be up to 74 bits wide. In some embodiments, a bypass path (not shown) may convey the four dimensionless output vectors 111, 112, 121, and 122 around 4:2 compressor 104 from left multiplier 101 and right multiplier 102 to 3:2 compressor 108.

Specialized processing block 100 may receive another vector 117 from another specialized processing block. 3:2 compressor 108 may receive vector 117, along with vectors 114 and 124 and provide vectors 118 and 128. Multiplexer 109 may select between vectors 114, 124 and vectors 118, 128, allowing 3:2 compressor 108 to be bypassed if cascade input 117 is not used. AND gate 107 may set input 117 to zero when, for example, the structure is being used in an accumulator mode and the accumulator has to be reset.

It will be recognized by one skilled in the art, that specialized processing block 100 may include circuitry with different compression rates and architectures that may create the same effect as 4:2 compressor 104 followed by 3:2 compressor 108.

Output vectors 119 and 129 may each be up to 74 bits wide and are input to main adder 200 to provide the resultant product of the multiplication operation, which can be a fixed-point output 130 or a floating-point output 131. In a floating-point case, the exponent may be handled at 132.

When multiplying two floating-point numbers according to the IEEE 754-1985 standard, the input multiplicands are normalized numbers between decimal 1.0 and decimal 1.999 . . . . Therefore, the resultant product can be between decimal 1.0 and decimal 3.999 . . . , and may be subject to normalization and rounding.

To accommodate normalization and rounding, it may be necessary to add either zero, one or two to the least significant bit(s) of the result (which may be referred to as the sum).

Specifically, normalization may involve a right shift of zero bits or one bit (if the result is greater than or equal to decimal 1.0 and less than decimal 2.0, the right shift is zero bits; if the result is greater than or equal to decimal 2.0 and less than decimal 4.0 the right shift is one bit). In cases where rounding is not applied, whether the normalization is 0 bit or 1 bit, the sum-plus-zero (i.e., the sum) may be used. In cases where rounding is applied, then if the normalization is zero bits, the sum-plus-1 may be used, while if the normalization is one bit, the sum-plus-2 may be used.

Therefore, in accordance with embodiments, and as described in more detail below, those three quantities (sum-plus-zero, sum-plus-one and sum-plus-two) are generated simultaneously using different portions of the circuitry, and then one of the three quantities is selected as the final result using a signal (e.g., a carry signal) from another portion of the calculation, thereby eliminating the need to wait for the other portion of the calculation before generating the appropriate result (i.e., sum-plus-zero, sum-plus-one or sum-plus-two).

Figure 2:
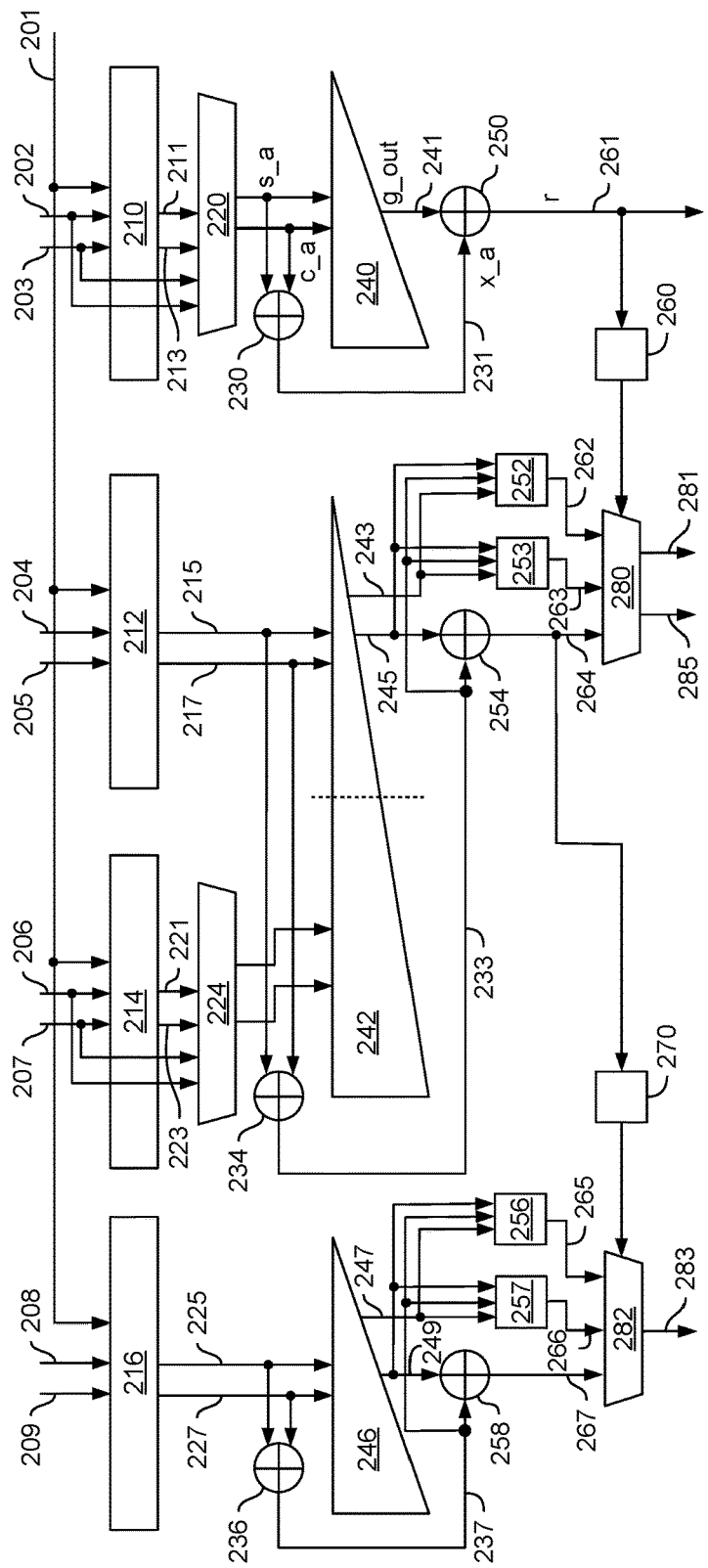
FIG. 2 is a diagram of an illustrative arithmetic circuitry that computes sum-plus-zero, sum-plus-one, and sum-plus-two signals for half- and single-precision floating-point multiplication operations in accordance with an embodiment.

In one embodiment, generating the three results simultaneously is accomplished by the circuitry shown in FIG. 2. As shown in this logical representation, the circuitry may include 3:2 compressors 210, 212, 214, and 216, multiplexers 220, 224, 280, and 282, prefix networks 240, 242, and 246, exclusive OR gates 230, 234, 236, 250, 254, and 258, circuits 253 and 257 to generate sum-plus-one signals, circuits 252 and 256 to generate sum-plus-two signals, and rounding selection circuits 260 and 270.

3:2 compressors 210, 212, 214, and 216 may receive partial products computed by upstream circuitry (e.g., from 4:2 compressor 104 of FIG. 1 or from left multiplier 101 and right multiplier 102 via a bypass path). As an example, 3:2 compressors 210 and 212 may receive the partial product (e.g., signals 202, 203, 204, and 205) of a first half-precision floating-point operation and 3:2 compressors 214 and 216 may receive the partial product (e.g., signals 206, 207, 208, and 209) of a second half-precision floating-point operation. As another example, 3:2 compressors 210 and 212 may receive the least significant bits (LSBs) and 3:2 compressors 214 and 216 the most significant bits (MSBs) of the partial products of a single-precision floating-point multiplication operation, respectively. In some embodiments, signal 201 may be zero when operating the circuitry of FIG. 2 in floating-point operation mode.

As shown, 3:2 compressors 210, 212, 214, and 216 may each generate two signals, which may be referred to as sum vector signals 211, 215, 221, and 225, or simply sum signals and carry vector signals 213, 217, 223, and 227, or simply carry signals. For example, 3:2 compressor 210 may perform a bitwise logical XOR operation of the respective input signals (i.e., signals 202 and 203) to generate the respective sum signal (i.e., signal 211) and a bitwise logical AND operation of the respective input signals (i.e., signals 202 and 203) to generate the respective carry signal (i.e., signal 213).

In some embodiments, 3:2 compressors 210, 212, 214, and 216 may selectively insert zeros into the partial products, for example to align the carry and sum signals with the boundaries of prefix networks 240, 242, and 246, if desired.

For example, the rounding point of a floating-point multiplication operation may be aligned with the floating-point break points between prefix networks (e.g., prefix networks 240, 242, and 246). The rounding point may be the boundary between the LSB of the floating-point multiplication result, and the round, guard, and sticky bits. If desired, the rounding point for the single-precision floating-point multiplication may be between bits 23 and 24. Thus, prefix networks 240 and 242 may have a break point between bits 23 and 24.

The circuitry of FIG. 2 may support two half-precision floating-point multiplication operations. Thus, a first half-precision floating-point multiplication operation may be aligned between bits 23 and 24. However, a half-precision multiplication operation may not map to this location. The multiplier and multiplicand values of a half-precision floating-point multiplication operation are odd and include one implied leading bit and 10 mantissa bits, while the multiplier and multiplicand values of a single-precision floating-point multiplication operation are even and include one implied leading bit and 23 mantissa bits.

In other words, a single-precision floating-point multiplier may have two 24-bit inputs, with a fractional range of 1.0 (i.e., an implied '1' followed by 23 zeros) to 1.99 . . . 99 (i.e., an implied '1' followed by 23 ones), with a result of between 1.0 and 3.999 . . . 99. The result may have a bit range of one, followed by 46 zeros to one, followed by 47 bits which are mostly ones. If the result is between 1.0 and 1.99 . . . 99, the 23-bit mantissa may be in the bit range 46 down to 24, and if the result is between 2.0 and 3.99 . . . 99, the 23-bit mantissa may be in the bit range 47 down to 25. Similarly, the 10-bit mantissa of a half-precision floating-point multiplication operation may be in the range 33 down to 24 or 34 down to 25.

If desired, the first and second half-precision floating-point multiplication operations may use asymmetric offsets to align to the rounding point of the single-precision floating-point multiplication operation. If desired, 10 bits may be inserted on either side of the rounding boundary of the first half-precision floating-point multiplication operation. For example, 13 zeros may be inserted in the LSBs of the multiplier inputs 113 of FIG. 1 by adding seven LSB zeros to input BX and six LSB zeros to input BY, or alternatively, any combination of zeros totaling 13.

The second half-precision floating-point multiplication operation may have a lower section of 17 bits and an upper section of 20 bits. The rounding boundary may be between the two sections. Thus, 10 bits may be balanced on either side of the rounding boundary. If desired, four LSB zeros may be inserted into input AX and three LSB zeros into input AY, or any other combination of seven zeros.

Multiplexers 220 and 224 may receive the carry signals 213 and 223 and the sum signals 211 and 221, respectively, and the partial products 202, 203 and 206, 207, respectively, and select between the carry and sum signals and the partial products. For example, multiplexer 220 may select partial products 202 and 203 when operating the circuitry of FIG. 2 in single-precision floating-point mode, thereby bypassing 3:2 compressor 210. As another example, multiplexers 220 and 224 may select partial products 202, 203 and 206, 207, respectively, when operating the circuitry of FIG. 2 in half-precision floating-point mode, thereby bypassing 3:2 compressors 210 and 214, respectively.

As shown, prefix networks 240 and 242 may receive the selected carry and sum signals from multiplexers 220 and 224, respectively. Prefix networks 242 and 246 may receive carry and sum signals 217, 215 and 227, 225 from 3:2 compressors 212 and 216, respectively. If desired, prefix network 242 may be split into two sections as denoted by the dashed vertical line when the circuitry of FIG. 2 is operating in half-precision floating-point mode.

Each prefix network of prefix networks 240, 242, and 246 may be, for example, a Kogge-Stone prefix network or any other prefix network such as a Brent-Kung prefix network or a Han Carlson prefix network, just to name a few, which outputs respective generate and propagate signals.

For example, prefix network 240 may receive selected sum signal s_a and carry signal c_a from multiplexer 220 and create the generate signal g_out 241. Similarly, prefix network 242 may receive selected sum and carry signals from multiplexer 224 and sum and carry signals 215 and 217 from 3:2 compressor 212 and create propagate and generate signals 243 and 245, and prefix network 246 may receive sum and carry signals 225 and 227 from 3:2 compressor 216 and create propagate and generate signals 247 and 249.

When using prefix networks 240, 242, and 246, a bitwise logical AND operation of the respective carry and sum signals may create respective input generate signals and a bitwise logical OR operation may create respective input propagate signals. If desired, the input propagate signals may be calculated as the logical XOR of the respective sum and carry signals.

Figure 3:
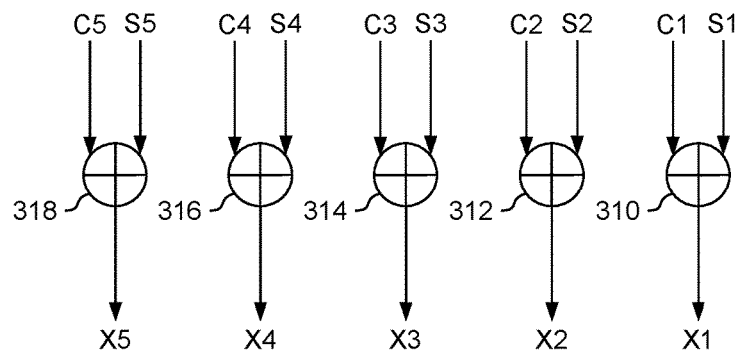
FIG. 3 is a diagram of an illustrative arithmetic operator circuitry that determines input generate and propagate signals based on carry and sum signals from a 3:2 compressor in accordance with an embodiment.
Figure 3:
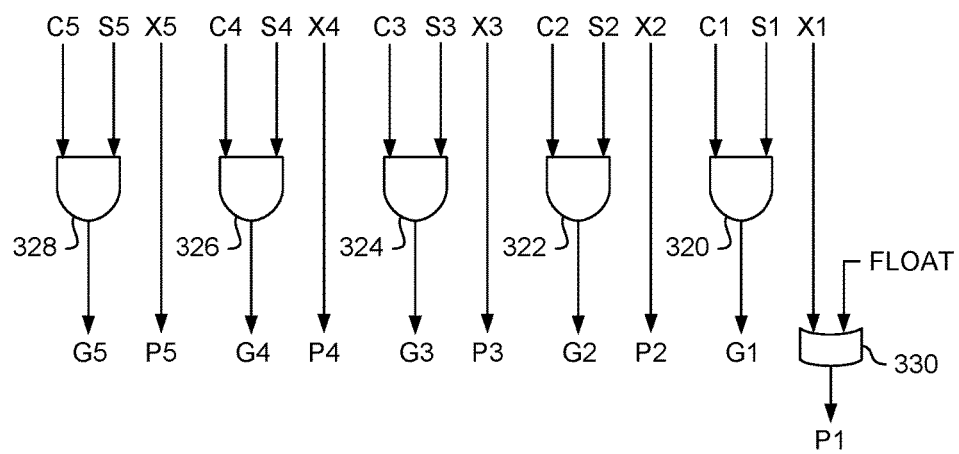

FIG. 3 shows an illustrative arithmetic operator circuitry that determines input generate and propagate signals based on carry and sum signals. As shown, the arithmetic operator circuitry may include logical exclusive AND gates 320, 322, 324, 326, and 328 that may perform a bitwise logical AND operation of sum signals (S1, S2, S3, S4, and S5) and carry signals (C1, C2, C3, C4, and C5) to produce input generate signals (G1, G2, G3, G4, and G5).

If desired, the arithmetic operator circuit may include logical exclusive OR gates 310, 312, 314, 316, and 318 that may perform a bitwise logical XOR operation of sum signals (S1, S2, S3, S4, and S5) and carry signals (C1, C2, C3, C4, and C5) to produce XORed signals (X1, X2, X3, X4, and X5).

In some embodiments, logical exclusive OR gates 310, 312, 314, 316, and 318 may implement a portion of logical exclusive OR gates 230, 234, and 236 of FIG. 2, respectively. For example, logical exclusive OR gates 230 may perform a bitwise logical XOR operation of sum and carry signals s_a and c_a to generate XORed signals x_a (231), logical exclusive OR gates 234 may perform a bitwise logical XOR operation of sum and carry signals 215 and 217 to generate XORed signals 233, and logical exclusive OR gates 236 may perform a bitwise logical XOR operation of sum and carry signals 225 and 227 to generate XORed signals 237.

In some embodiments, the least significant bit (LSB) of the input propagate signal (i.e., signal P1) may be set to '1' when operating the arithmetic operator circuit in single-precision or half-precision floating-point mode. For example, setting the LSB of the input propagate signal (i.e., signal P1) to '1' may enable the generation of the sum-plus-one and sum-plus-two signals when the circuitry of FIG. 2 performs a round-to-nearest-even rounding operation.

As shown, logical OR gate 330 of FIG. 3 may perform a logical OR operation between the XORed signal X1 and signal FLOAT which may be '1' when the arithmetic operator circuit performs a floating-point operation and '0' otherwise, thereby setting the LSB of the input propagate signal P1 to '1' when the arithmetic operator circuit performs a floating-point operation and to the XORed signal X1 otherwise.

To simplify discussion, FIGS. 3-6 only show a limited number of bits to illustrate the generation of the sum-plus-zero, the sum-plus-one, and the sum-plus-two signals. For example, only five bits of the carry and sum signals are shown in the logical representation of the arithmetic operator circuit of FIG. 3. If desired, the carry and sum signals and thus the input and output generate and propagate, and the XORed signals as well as the sum-plus-zero, sum-plus-one, and sum-plus-two signals may have any number of bits. For example, the input generate and propagate signals may have 18 bits, 23 bits, 32 bits, or any other number of bits.

The circuitry of FIG. 2 may generate the sum-plus-zero, sum-plus-one, and sum-plus-two signals based on output generate signals 241, 245, and 249, output propagate signals 243 and 247, and the XORed signals 231, 233, and 237. For example, logical exclusive OR gates 254 and 258 may compute the sum-plus-zero signals 264 and 267 of two half-precision floating-point multiplications or the LSBs 264 and MSBs 267 of the sum-plus-zero signal of a single-precision floating-point multiplication operation by performing a bitwise logical XOR operation of output generate signals 245 and 249 with XORed signals 233 and 237, respectively.

Figure 4A:
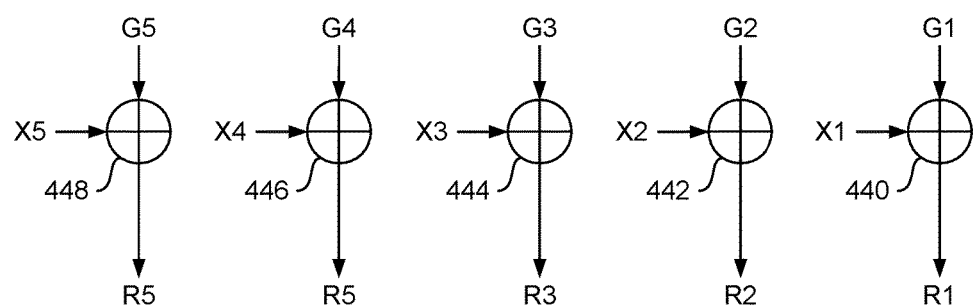
FIG. 4A is a diagram of illustrative arithmetic operator circuit that computes a sum-plus-zero signal in accordance with an embodiment.

The computation of a sum-plus-zero signal based on output generate signals and XORed signals is further illustrated in FIG. 4A. As shown in FIG. 4A, logical exclusive OR gates 440, 442, 444, 446, and 448 may perform a bitwise logical XOR operation of output generate signals G1, G2, G3, G4, and G5 and XORed signals X1, X2, X3, X4, and X5 to generate the sum-plus-zero signal R1, R2, R3, R4, and R5.

As another example, circuit 253 may generate the sum-plus-one signal 263 of a half-precision floating-point multiplication or a single-precision floating-point multiplication operation based on output generate signal 245, output propagate signal 243, and XORed signal 233. Similarly, circuit 257 may generate the sum-plus-one signal 266 of another half-precision floating-point multiplication operation based on output generate signal 249, output propagate signal 247, and XORed signal 237.

Figure 4B:
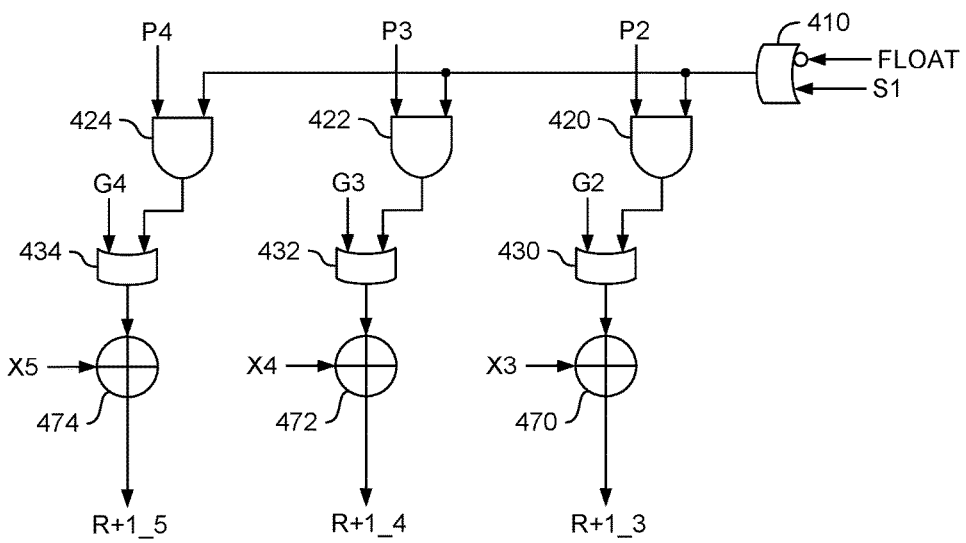
FIG. 4B is a diagram of illustrative arithmetic operator circuitry that computes a sum-plus-one signal in accordance with an embodiment.

The computation of a sum-plus-one signal based on output generate and propagate signals and XORed signals is further illustrated in FIG. 4B. As shown in FIG. 4B, logical OR gate 410 performs the logical OR operation of the LSB of the sum signal (i.e., signal S1) and the inversion of a mode signal (i.e., signal FLOAT) that indicates whether the circuitry is performing a floating-point operation (i.e., a single-precision floating-point operation or two half-precision floating-point operations) or a fixed-point operation. In other words, the output of logical OR gate 410 is the LSB of the sum signal (i.e., signal S1) when the circuitry is performing a floating-point operation and '1' otherwise.

Logical AND gates 420, 422, and 424 may perform a logical AND operation of the output of logical OR gate 410 and output propagate signals P2, P3, and P4, respectively. Thus, logical AND gates 420, 422, and 424 propagate the output propagate signals P2, P3, and P4, respectively, if the LSB of the sum signal (i.e., signal S1) is '1' or if the circuitry does not perform a floating-point operation.

Logical OR gates 430, 432, and 434 may perform a logical OR operation of the outputs of logical AND gates 420, 422, and 424 and output generate signals G2, G3, and G4, respectively, and logical exclusive OR gates 470, 472, and 474 may generate the sum-plus-one signal (i.e., R+1_3, R+1_4, and R+1_5) by performing a logical XOR operation of the outputs of logical OR gates 430, 432, and 434 with XORed signals X3, X4, and X5, respectively.

As another example, circuit 252 may generate the sum-plus-two signal 262 of a half-precision floating-point multiplication or a single-precision floating-point multiplication operation based on output generate signal 245, output propagate signal 243, and XORed signal 233. Similarly, circuit 256 may generate the sum-plus-two signal 265 of another half-precision floating-point multiplication operation based on output generate signal 249, output propagate signal 247, and XORed signal 237.

Figure 4C:
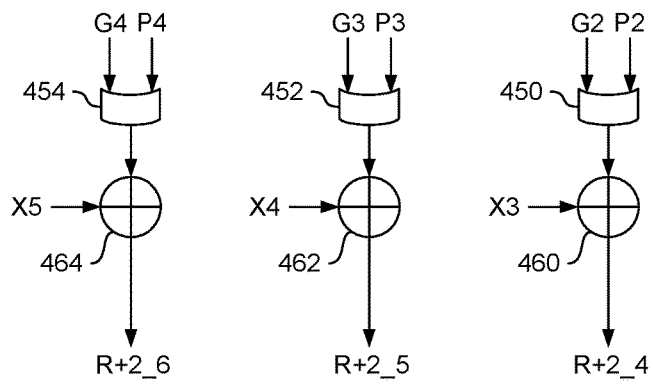
FIG. 4C is a diagram of illustrative arithmetic operator circuitry that computes a sum-plus-two signal in accordance with an embodiment.

The computation of a sum-plus-two signal based on output generate and propagate signals and XORed signals is further illustrated in FIG. 4C.

Logical OR gates 450, 452, and 454 may perform a logical OR operation of output propagate signals P2, P3, and P4 and output generate signals G2, G3, and G4, respectively, and logical exclusive OR gates 460, 462, and 464 may generate the sum-plus-two signal (i.e., R+2_4, R+2_5, and R+2_6) by performing a logical XOR operation of the outputs of logical OR gates 450, 452, and 454 with XORed signals X3, X4, and X5, respectively.

Rounding selection circuits 260 and 270 may generate a control signal that selects between the respective sum-plus-zero signal, sum-plus-one signal, and sum-plus-two signal at multiplexers 280 and 282. For example, rounding selection circuit 260 may generate a control signal based on the output of logical exclusive OR gate 250 which performs a logical XOR operation of output generate signal 241 and XORed signal 231. Similarly, rounding selection circuit 270 may generate a control signal based on the MSBs of the signal selected by multiplexer 280 (i.e., based on signal 285).

Figure 5:
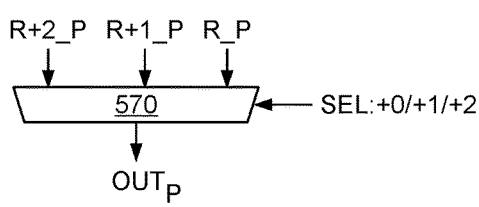
FIG. 5 is a diagram of an illustrative circuit that selects among sum-plus-zero, sum-plus-one, and sum-plus-two signals in accordance with an embodiment.

FIG. 5 is a diagram of an illustrative circuit that selects among sum-plus-zero, sum-plus-one, and sum-plus-two signals. As shown, multiplexer 570 may receive sum-plus-zero signal R_P, sum-plus-one signal R+1_P, and sum-plus-two signal R+2_P and select among the received signal based on a control signal (i.e., signal SEL) that indicates whether to select the sum-plus-zero signal (e.g., SEL=+0='001') the sum-plus-one signal (e.g., SEL=+1='010'), or the sum-plus-two signal (e.g., SEL=+2='100').

Multiplexers 280 and 282 of FIG. 2 may output the selected signal (i.e., sum-plus-zero, sum-plus-one, or sum-plus-two) as signals 281, 285, and 283, respectively. For example, multiplexer 280 may output the result of a first half-precision floating-point multiplication operation as signal 285 concatenated with signal 281, and multiplexer 282 may output the result of a second half-precision floating-point multiplication operation as signal 283. If desired, multiplexer 280 may output the result of a single-precision floating-point multiplication operation as signals 285 concatenated with signal 281.

Figure 6:
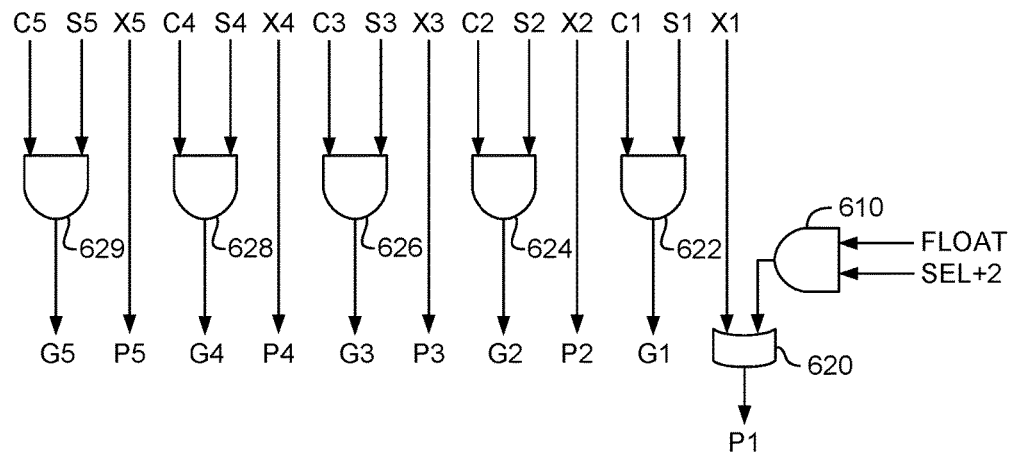
FIG. 6 is a diagram of an illustrative circuit that computes sum-plus-zero, sum-plus-one, and sum-plus-two signals based on carry and sum signals from a 3:2 compressor in accordance with an embodiment.
Figure 6:
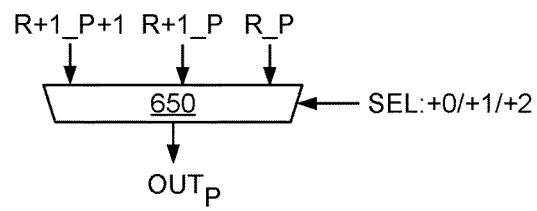
Figure 6:
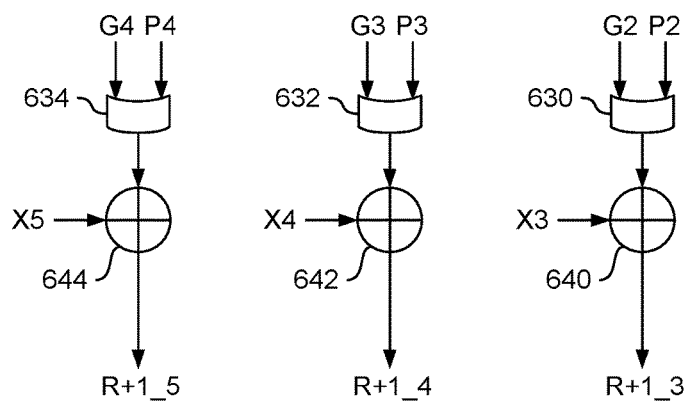

If desired, the generation of the sum-plus-one signal shown in FIG. 4B and the generation of the sum-plus-two signal shown in FIG. 4C may be combined. FIG. 6 shows a diagram of an illustrative arithmetic circuit that generates sum-plus-zero and sum-plus-one signals and determines the sum-plus-two signal based on the sum-plus-one signal for half- and single-precision floating-point multiplication operations.

As shown, the arithmetic operator circuit may include logical exclusive AND gates 622, 624, 626, 628, and 629 that may perform a bitwise logical AND operation of sum signals (S1, S2, S3, S4, and S5) and carry signals (C1, C2, C3, C4, and C5) to produce input generate signals (G1, G2, G3, G4, and G5).

If desired, the arithmetic operator circuit may include logical exclusive OR gates 310, 312, 314, 316, and 318 that may perform a bitwise logical XOR operation of sum signals (S1, S2, S3, S4, and S5) and carry signals (C1, C2, C3, C4, and C5) to produce XORed signals (X1, X2, X3, X4, and X5).

In some embodiments, the a logical XOR operation of carry and sum signals may generate the input propagate signals P2, P3, P4, and P5 (i.e., the XORed signals X2, X3, X4, and X5).

In some embodiments, the least significant bit (LSB) of the input propagate signal (i.e., signal P1) may be set to '1' when generating the sum-plus-two signal and operating the arithmetic operator circuit in single-precision or half-precision floating-point mode. As shown, logical AND gate 610 may perform a logical AND operation between signal FLOAT which may be '1' when the arithmetic operator circuit performs a floating-point operation and '0' otherwise, and signal SEL+2 which may be '1' when generating the sum-plus-two signal. Logical OR gate 620 may perform a logical OR operation between the XORed signal X1 and the output of logical AND gate 610, thereby setting the LSB of the input propagate signal P1 to '1' when the arithmetic operator circuit generates the sum-plus-two signal and performs a floating-point operation and to the XORed signal X1 otherwise.

The sum-plus-two signal may be generated using the circuitry that generates the sum-plus-one signal. As shown, logical OR gates 630, 632, and 634 may perform a logical OR operation of output propagate signals P2, P3, and P4 and output generate signals G2, G3, and G4, respectively, and logical exclusive OR gates 640, 642, and 644 may generate the sum-plus-one signal (i.e., R+1_3, R+1_4, and R+1_4) by performing a logical XOR operation of the outputs of logical OR gates 630, 632, and 634 with XORed signals X3, X4, and X5, respectively.

Multiplexer 650 may receive sum-plus-zero signal R_P, sum-plus-one signal R+1_P, and sum-plus-two signal R+1_P+1, which is the next higher bit of the sum-plus-one signal, and select among the received signal based on a control signal (i.e., signal SEL) that indicates whether to select the sum-plus-zero signal (e.g., SEL=+0='001') the sum-plus-one signal (e.g., SEL=+1='010'), or the sum-plus-two signal (e.g., SEL=+2='100').

Figure 7:
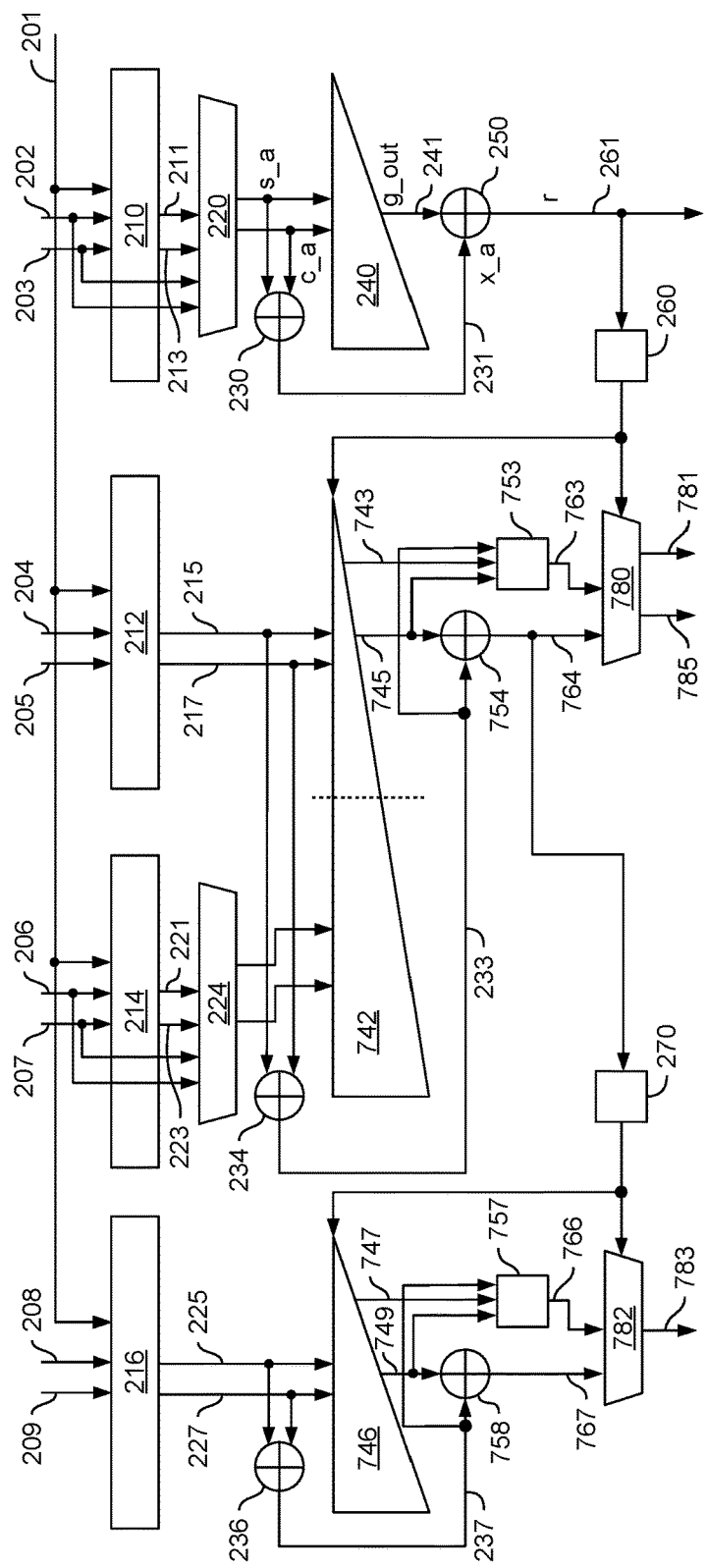
FIG. 7 is a diagram of illustrative arithmetic circuitry that computes sum-plus-zero and sum-plus-one signals and determines the sum-plus-two signal based on the sum-plus-one signal for half- and single-precision floating-point multiplication operations in accordance with an embodiment.

FIG. 7 shows an embodiment of illustrative arithmetic circuitry that computes sum-plus-zero and sum-plus-one signals and determines the sum-plus-two signal based on the sum-plus-one signal for half- and single-precision floating-point multiplication operations. As shown, the circuitry of FIG. 7 may reuse a portion of the circuitry from FIG. 2. For example, the circuitry of FIG. 7 may include 3:2 compressors 210, 212, 214, and 216, multiplexers 220 and 224, logical exclusive OR gates 230, 234, 236, and 250, prefix network 240, and rounding selection circuits 260 and 270, which may generate sum and carry signals, input propagate and generate signals, and some of the output propagate and generate signals in the same way as described in FIG. 2.

For example, rounding selection circuits 260 and 270 may generate a control signal that selects between the respective sum-plus-zero signal, sum-plus-one signal, and sum-plus-two signal at multiplexers 780 and 782. The control signal may feed into prefix networks 742 and 746, which both may be, for example, a Kogge-Stone prefix network or any other prefix network such as a Brent-Kung prefix network or a Han Carlson prefix network, just to name a few, which outputs respective output generate signals 745 and 749 and output propagate signals 743 and 747 based on the respective carry and sum signals and the respective control signals.

The circuitry of FIG. 7 may generate the sum-plus-zero and sum-plus-one signals based on output generate signals 745 and 749, output propagate signals 743 and 747, and the XORed signals 233 and 237. For example, logical exclusive OR gates 754 and 758 may compute the sum-plus-zero signals 764 and 767 of two half-precision floating-point multiplications or the LSBs 764 and MSBs 767 of the sum-plus-zero signal of a single-precision floating-point multiplication operation by performing a bitwise logical XOR operation of output generate signals 745 and 749 with XORed signals 233 and 237, respectively.

As another example, circuit 753 may compute the sum-plus-one signal 763 of a half-precision floating-point multiplication or a single-precision floating-point multiplication operation based on output generate signal 745, output propagate signal 743, and XORed signal 233, for example as shown in FIG. 6, if desired. Similarly, circuit 757 may compute the sum-plus-one signal 766 of a half-precision floating-point multiplication operation based on output generate signal 749, output propagate signal 747, and XORed signal 237, for example as shown in FIG. 6, if desired.

The sum-plus-two signals may be generated using the circuitry that generates the sum-plus-one signal. Thus, multiplexers 780 and 782 may output the selected signal (i.e., sum-plus-zero, sum-plus-one, or sum-plus-two) as signals 781, 785, and 783, respectively. For example, multiplexer 780 may output the result of a first half-precision floating-point multiplication operation as signal 785 concatenated with signal 781, and multiplexer 782 may output the result of a second half-precision floating-point multiplication operation as signal 783. If desired, multiplexer 780 may output the result of a single-precision floating-point multiplication operation as signals 781 and 785. If desired, the sum-plus-one and sum-plus-two signals may be generated as shown in FIG. 6.

Figure 8:
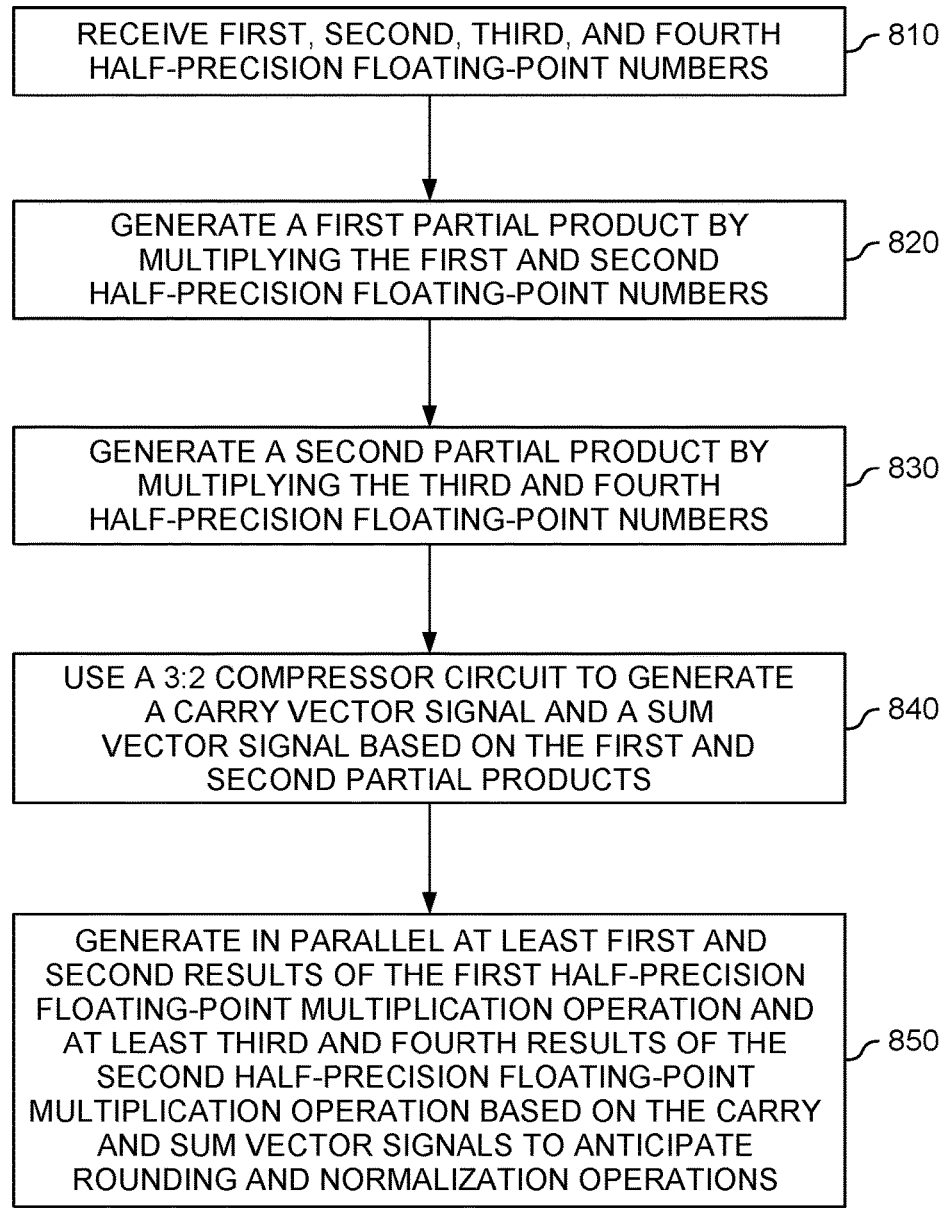
FIG. 8 is a diagram of a flow chart showing illustrative steps for operating a specialized processing block in accordance with an embodiment.

FIG. 8 is a diagram of a flow chart showing illustrative steps for operating a specialized processing block in accordance with an embodiment. During step 810, the specialized processing block may receive first, second, third, and fourth half-precision floating-point numbers. For example, specialized processing block 100 of FIG. 1 may receive half-precision floating-point numbers BX, BY, AX, and Ay.

During step 820, the specialized processing block may generate a first partial product by multiplying the first and second half-precision floating-point numbers. For example, right multiplier 102 of specialized processing block 100 of FIG. 1 may compute a partial product (i.e., signals 112 and 122).

During step 830, the specialized processing block may generate a second partial product by multiplying the third and fourth half-precision floating-point numbers. For example, left multiplier 101 of specialized processing block 100 may compute another partial product (i.e., signals 114 and 124).

During step 840, the specialized processing block may use a 3:2 compressor circuit to generate a carry vector signal and a sum vector signal based on the first and second partial products. For example, the circuitry of FIG. 2 may generate carry vector signals 213, 217, 223, and 227 based on partial products 112, 122, 114, and 124.

During step 850, the specialized processing block may generate in parallel at least first and second results of the first half-precision floating-point multiplication operation and at least third and fourth results of the second half-precision floating-point multiplication operation based on the carry and sum vector signals to anticipate rounding and normalization operations. For example, the circuitry of FIG. 2 may generate the sum-plus-zero result and the sum-plus-one result of the first half-precision floating-point multiplication operation (i.e., signals 264 and 263) and of the second half-precision floating-point multiplication operation (i.e., signals 267 and 266) based on the respective carry and sum vector signals.

The method and apparatus described herein may be incorporated into any suitable circuit or system of circuits. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), digital signal processing (DSP) circuits, application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using half-precision floating-point arithmetic operations and single-precision floating-point arithmetic operations is desirable.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein. The foregoing embodiments may be implemented individually or in any combination. The above described embodiments are presented for purposes of illustration and not of limitation, and the present invention is limited only by the claims that follow.

What is claimed is:

1. Single-precision floating-point multiplication circuitry that performs first and second half-precision floating-point multiplication operations, comprising:
   a first arithmetic operator circuit that generates a first partial product of first and second half-precision floating-point numbers;
   a second arithmetic operator circuit that generates a second partial product of third and fourth half-precision floating-point numbers;
   a compressor circuit that generates a carry vector signal and a sum vector signal based on the first and second partial products; and
   a third arithmetic operator circuit that generates at least first and second results of the first half-precision floating-point multiplication operation in parallel to each other and at least third and fourth results of the second half-precision floating-point multiplication operation in parallel to each other based on the carry and sum vector signals to anticipate rounding and normalization operations.

2. The single-precision floating-point multiplication circuitry of claim 1, comprising:
   a first partial product generator in the first arithmetic operator circuit that generates first and second output vector signals as the first partial product based on the first and second half-precision floating-point numbers; and
   a second partial product generator in the second arithmetic operator circuit that generates third and fourth output vector signals as the second partial product based on the third and fourth half-precision floating-point numbers.

3. The single-precision floating-point multiplication circuitry of claim 2, wherein the first arithmetic operator circuit comprises:
   a fourth arithmetic operator circuit that performs a 4:2 compression of the first, second, third, and fourth output vector signals; and
   a bypass path around the fourth arithmetic operator circuit that conveys the first and second output vector signals as the first partial product from the first arithmetic operator circuit to the compressor circuit and the third and fourth output vector signals as the second partial products from the second arithmetic operator circuit to the compressor circuit.

4. The single-precision floating-point multiplication circuitry of claim 1, comprising:
   bypass multiplexers, wherein the compressor circuit in conjunction with the bypass multiplexers selectively inserts zeros into the first and second partial products to generate the sum and carry vector signals.

5. The single-precision floating-point multiplication circuitry of claim 1, wherein the third arithmetic operator circuit comprises:
   a combinational circuit that generates an input propagate vector signal and an input generate vector signal based on the carry and sum vector signals.

6. The single-precision floating-point multiplication circuitry of claim 5, wherein the combinational circuit comprises:
   logical exclusive OR gates that perform a bitwise XOR operation of the carry and sum vector signals to generate the input propagate vector signal, wherein the least significant bit of the input propagate vector signal is set to one; and
   logical AND gates that perform a bitwise AND operation of the carry and sum vector signals to generate the input generate vector signal.

7. The single-precision floating-point multiplication circuitry of claim 5, wherein the third arithmetic operator circuit comprises:
   a prefix network that generates an output propagate vector signal and an output generate vector signal based on the input propagate and generate vector signals.

8. The single-precision floating-point multiplication circuitry of claim 7, wherein the third arithmetic operator circuit comprises:
   an additional combinational circuit that generates sum-plus-zero, sum-plus-one, and sum-plus-two signals based on the output generate and propagate vector signals and the carry and sum vector signals, wherein the first results of the first half-precision floating-point multiplication operation comprises one of the sum-plus-zero, sum-plus-one, and sum-plus-two signals for the first half-precision floating-point multiplication operation, wherein the second results of the first half-precision floating-point multiplication operation comprises another of the sum-plus-zero, sum-plus-one, and sum-plus-two signals for the first half-precision floating-point multiplication operation, wherein the third results of the second half-precision floating-point multiplication operation comprises one of the sum-plus-zero, sum-plus-one, and sum-plus-two signals for the second half-precision floating-point multiplication operation, wherein the fourth results of the second half-precision floating-point multiplication operation comprises another of the sum-plus-zero, sum-plus-one, and sum-plus-two signals for the second half-precision floating-point multiplication operation.

9. The single-precision floating-point multiplication circuitry of claim 8, wherein the third arithmetic operator circuit comprises:
   a selection circuit that generates a control signal based on a predetermined rounding scheme; and
   a multiplexer that selects between the sum-plus-zero, sum-plus-one, and sum-plus-two signals based on the control signal.

10. A method for operating specialized processing circuitry, comprising:
    receiving first, second, third, and fourth half-precision floating-point numbers;
    generating, using a first arithmetic operator circuit, a first partial product by multiplying the first and second half-precision floating-point numbers;
    generating, using a second arithmetic operator circuit, a second partial product by multiplying the third and fourth half-precision floating-point numbers;
    using a compressor circuit to generate a carry vector signal and a sum vector signal based on the first and second partial products; and
    generating, using a third arithmetic operator circuit, at least first and second results of the first half-precision floating-point multiplication operation in parallel to each other and at least third and fourth results of the second half-precision floating-point multiplication operation in parallel to each other based on the carry and sum vector signals to anticipate rounding and normalization operations.

11. The method of claim 10, wherein the first partial product includes first and second output vector signals and the second partial product includes third and fourth output vector signals, the method comprising:
    performing a 4:2 compression of the first, second, third, and fourth output vector signals using a 4:2 compressor circuit; and
    selectively routing the first and second output vector signals as the first partial product on a bypass path around the 4:2 compressor circuit to the compressor circuit.

12. The method of claim 10, wherein using the compressor circuit to generate the carry vector signal and the sum vector signal comprises:
    selectively inserting zeros into the first and second partial products.

13. The method of claim 10, wherein generating in parallel the at least first and second results and the at least third and fourth results comprises:
    performing a bitwise XOR operation of the carry and sum vector signals to generate the input propagate vector signal;

setting the least significant bit of the input propagate vector signal to one; and performing a bitwise AND operation of the carry and sum vector signals to generate the input generate vector signal.

14. The method of claim 13, comprising:

using a prefix network to generate an output propagate vector signal and an output generate vector signal based on the input propagate and generate vector signals; and generating sum-plus-zero, sum-plus-one, and sum-plus-two signals based on the output generate and propagate vector signals and the carry and sum vector signals.

15. The method of claim 14, comprising:

generating a control signal based on a predetermined rounding scheme; and selecting between the sum-plus-zero, sum-plus-one, and sum-plus-two signals based on the control signal.

16. A Specialized processing circuitry that receives first, second, third, and fourth input signals and that is configurable to select between performing a single-precision floating-point operation of concatenated first and third input signals with concatenated second and fourth input signals and performing two half-precision floating-point operations of first and second input signals and of third and fourth input signals, respectively, comprising:

a first partial product generator that generates a first partial product of first and second input signals;

a second partial product generator that generates a second partial product of third and fourth input signals;

a compressor circuit that generates a carry vector signal and a sum vector signal based on the first and second partial products; and circuitry that anticipates rounding and normalization operations by generating in parallel based on the carry and sum vector signals at least two results when performing the single-precision floating-point operation and at least four results when performing the two half-precision floating-point operations.

17. The specialized processing circuitry of claim 16, wherein the first partial product includes first and second output vector signals and the second partial product includes third and fourth output vector signals, comprising:

an arithmetic operator circuit that performs a 4:2 compression of the first, second, third, and fourth output vector signals when performing the single-precision floating-point operation; and a bypass path around the arithmetic operator circuit that conveys the first and second output vector signals as the first partial product from the first partial product generator to the compressor circuit and the third and fourth output vector signals as the second partial products from the second partial product generator to the compressor circuit when performing the two half-precision floating-point operations.

18. The specialized processing circuitry of claim 17, wherein the circuitry that anticipates rounding and normalization operations comprises:

a combinational circuit that generates an input propagate vector signal and an input generate vector signal based on the carry and sum vector signals.

19. The specialized processing circuitry of claim 18, wherein the combinational circuit comprises:

logical exclusive OR gates that perform a bitwise XOR operation of the carry and sum vector signals to generate the input propagate vector signal, wherein the least significant bit of the input propagate vector signal is set to one; and logical AND gates that perform a bitwise AND operation of the carry and sum vector signals to generate the input generate vector signal.

20. The specialized processing circuitry of claim 18, wherein the circuitry that anticipates rounding and normalization operations comprises:

a prefix network that generates an output propagate vector signal and an output generate vector signal based on the input propagate and generate vector signals; and an additional combinational circuit that generates sum-plus-zero, sum-plus-one, and sum-plus-two signals based on the output generate and propagate vector signals and the carry and sum vector signals.

\* \* \* \* \*